United States Patent

[11] 3,624,771

[72] Inventor Thomas V. McNamara
     Kalamazoo, Mich.
[21] Appl. No. 12,942
[22] Filed Feb. 20, 1970
[45] Patented Nov. 30, 1971
[73] Assignee Eaton Yale & Towne Inc.
     Cleveland, Ohio

[54] RESILIENT MOUNT FOR CLUTCH SHAFT PILOT BEARING
     7 Claims, 1 Drawing Fig.

[52] U.S. Cl. .................................................. 192/110 B, 64/13
[51] Int. Cl. .................................................. F16d 13/60
[50] Field of Search .................................. 192/110 B, 110 R, 111 R, 98, 109 A; 64/13

[56] References Cited
UNITED STATES PATENTS

| 2,143,300 | 1/1939 | Cole ........................... | 192/110 R |
| 2,571,267 | 10/1951 | Ljunggren ................... | 64/13 |
| 3,393,536 | 7/1968 | Daur ........................... | 64/13 |

FOREIGN PATENTS

| 202,701 | 4/1938 | Switzerland ................. | 192/110 R |

Primary Examiner—Benjamin W. Wyche
Assistant Examiner—Randall Heald
Attorney—Woodhams, Blanchard and Flynn ABSTRACT: A flywheel and clutch assembly for drivingly connecting an engine to a transmission, and having a resilient mounting for supporting the forward end of the transmission input shaft within the flywheel for accommodating both angular and radial misalignment between the flywheel and the transmission.

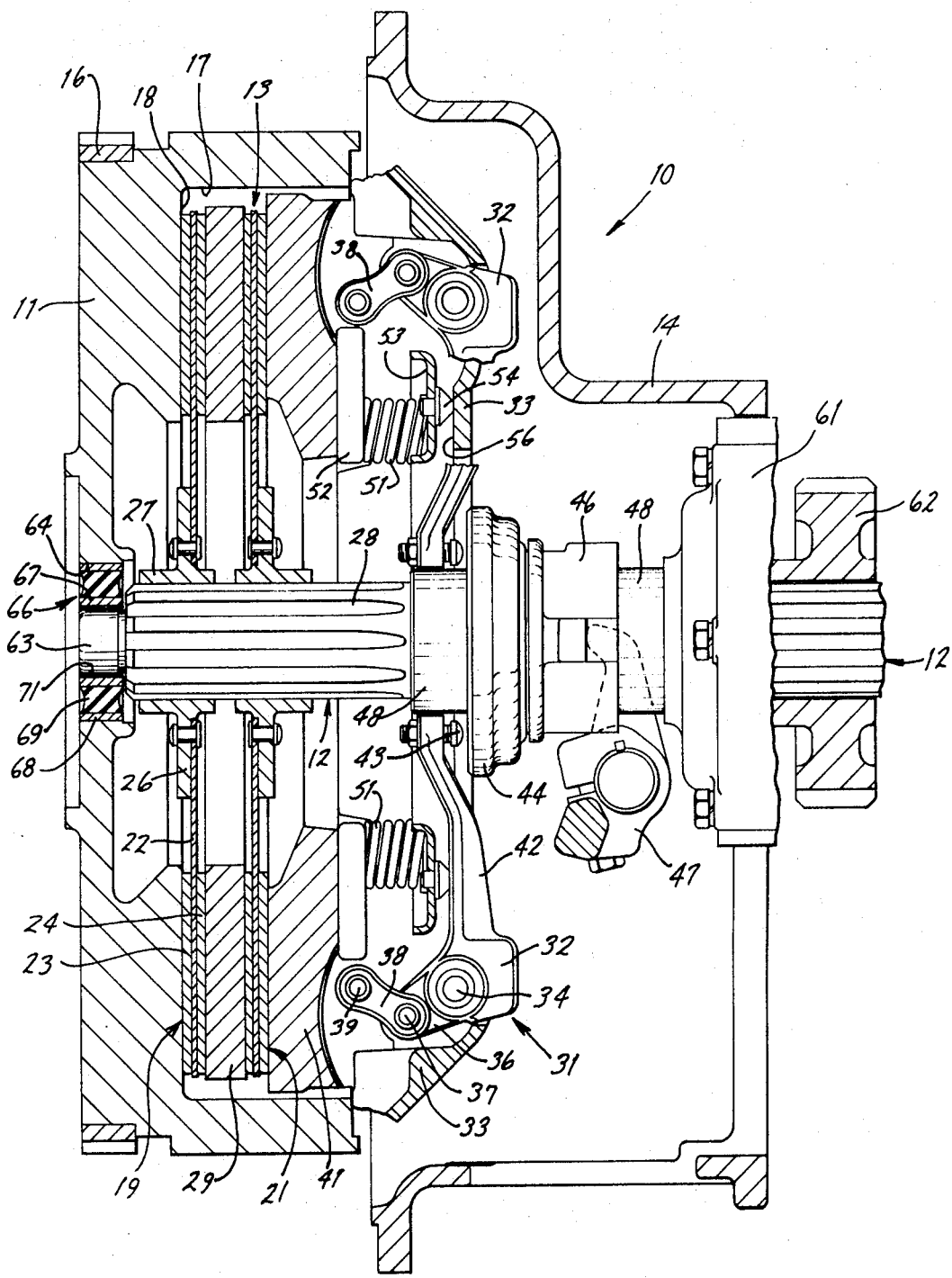

3,624,771

RESILIENT MOUNT FOR CLUTCH SHAFT PILOT BEARING

FIELD OF THE INVENTION

This invention relates to a flywheel and clutch assembly for drivingly connecting an engine to a transmission and, more particularly, relates to a flywheel and clutch assembly which provides a resilient mounting for supporting the forward end of the transmission input shaft within the flywheel for accommodating both angular and radial misalignment between the flywheel and the transmission.

BACKGROUND OF THE INVENTION

Most heavy-duty vehicles, such as trucks and busses, utilize a drive train having transmission, which is generally disposed rearwardly of the flywheel, and provided with an input shaft which is driven from the flywheel by means of the releasable clutch. The transmission input shaft is normally provided with a pilot portion on the forward end thereof which is rotatably received within a pilot bearing coaxially supported within the flywheel. This pilot bearing has presented a serious maintenance problem for a long period of time. Particularly, the pilot bearing often has only a short useful life cycle, thereby necessitating that the complete vehicle be disabled to enable the bearing or bushing to be replaced. This maintenance operation is necessarily time consuming and expensive due to the necessity of having to completely disassemble the flywheel and associated clutch structure.

The problem of pilot bearing failure has generally been attributed to the inability to supply and maintain adequate quantities of lubricant in the pilot bearing. Specifically, this area is not readily accessible or close to a source of lubricant, and thus feeding lubricant to this area has presented a continuing problem. Thus, while numerous prior attempts have been made to supply and maintain an adequate quantity of lubricant to the pilot bearing, these attempts have in general been unsuccessful in eliminating pilot bearing failure.

Applicant recently discovered that it was not necessarily and primarily the lack of lubricant which causes rapid failure of the pilot bearing, but rather that the apparent cause of pilot bearing failure was often due to relative misalignment between the flywheel and the transmission housing, which misalignment, even when small, often imposes excessively large loads on the pilot bearing so as frequently to cause failure thereof within a relatively short period of operation. This misalignment is generally due to tolerances in manufacture and distortion in the large housings and case members. Applicant particularly discovered that the misalignment between the transmission and the flywheel often occurs not only angularly but also radially, whereby the forward end of the input transmission shaft, as piloted within the flywheel, also tends to move both radially and angularly relative to the flywheel, thereby causing excessive loading of the pilot bearing so as to result in rapid failure thereof. Recognition of this problem and the solution thereto represents a major portion of the present invention.

Still a further problem associated with the known flywheel and clutch assemblies has been the fretting which occurs between the splined hub of the clutch disk and the associated splined portion of the input shaft. Due to the frequent relative misalignment between the transmission and the flywheel, relative movement often occurs between the splined hub and the splined shaft portion whenever the clutch disk is in clutching engagement with the flywheel. This relative motion thus causes a continuous sliding or oscillating movement between the associated splines of the hub and input shaft, thereby causing fretting. This has thus often minimized the useful life of the clutch hub and has required periodic replacement thereof.

The fretting of the clutch hub due to misalignment has also been substantially minimized by the present invention since the forward end of the transmission input shaft is supported by a resilient bushing so as to be both angularly and radially floatable relative to the flywheel. Thus, the angular rocking motion of the clutch hub on the input shaft is minimized, and the fretting problem is likewise minimized, thereby resulting in greater operational life of the clutch hub.

Accordingly, it is an object of the present invention:
1. To provide an improved pilot mounting within a flywheel for the forward end of the clutch and transmission input shaft.
2. To provide an improved pilot mounting, as aforesaid, wherein a resilient bushing is provided within the flywheel for permitting both angular and radial misalignment between the transmission and the flywheel.
3. To provide an improved pilot mounting, as aforesaid, which substantially minimizes the problem of pilot bearing failure.
4. To provide an improved pilot mounting, as aforesaid, which minimizes the fretting which occurs between the splined portion of the transmission input shaft and the associated splined clutch hub.
5. To provide a pilot bushing, as aforesaid, which minimizes the maintenance required on the flywheel and clutch assembly and results in more optimum and efficient utilization of the vehicle on which the assembly is provided.

Other objects and purposes of this invention will be apparent to persons acquainted with apparatus of this general type upon reading the following specification and inspecting the accompanying drawing.

SUMMARY OF THE INVENTION

In general, the objects and purposes of the present invention are met by providing a flywheel and clutch assembly disposed between and drivingly connecting a vehicle engine to the vehicle transmission. The assembly specifically includes a flywheel drivingly connected to the vehicle engine, the flywheel being provided with a central opening therein in which is received a suitable pilot bearing which in turn receives the forward end of the transmission input shaft. The rearward end of the transmission input shaft extends through the forward wall of the transmission housing and is provided with a transmission input gear nonrotatably supported thereon, which gear is in meshing engagement with associated driven gears of the transmission. A suitable clutch structure is disposed, and selectively drivingly connectable, between the flywheel and the transmission input shaft for driving same, the clutch structure being mechanically actuated in a conventional manner, as by an intermediate mechanical linkage connected to a manually actuated clutch pedal.

The pilot bearing provided between the forward end of the transmission input shaft and the flywheel specifically includes a resilient bushing having inner and outer annular ring members and a ring of resilient elastomeric material disposed, and preferably fixedly secured, therebetween. The resilient bushing permits both radial and angular misalignment between the flywheel and the transmission input shaft.

BRIEF DESCRIPTION OF THE DRAWING

The drawing discloses therein a cross-sectional view of a flywheel and clutch assembly incorporating therein the improved pilot mounting according to the present invention.

DETAILED DESCRIPTION

The drawing illustrates therein a clutch and flywheel assembly 10 used for drivingly connecting the engine and the transmission of a vehicle. The assembly 10 includes a flywheel 11 driven from the engine and drivingly connectable to the transmission input shaft 12 by an intermediate clutch means 13. The clutch means 13 is in turn substantially surrounded by a stationary housing 14.

The flywheel 11 is connected to and driven from the engine crankshaft in a conventional manner and an external ring gear 16 is provided for conventional engagement by the starting motor. The flywheel 11 includes a recess 17 therein, the bottom of which defines a friction surface 18 adapted for coaction with the clutch means 13.

The clutch means 13 in this embodiment includes a pair of identical friction disks 19 and 21, each of which includes a support plate 22 having annular friction pads 23 and 24 secured to the opposite sides thereof. The support plate 22 is fixedly secured to the flange 26 of the clutch hub 27, which clutch hub 27 is slidably and drivingly splined on the splined portion 28 of the transmission input shaft 12. A further intermediate clutch disk 29 is positioned axially between the friction disks 19 and 21, the disk 29 being nonrotatably interconnected to the flywheel 11 in a conventional manner (not shown) but for permitting limited axial movement of the disk 29 relative to the flywheel 11.

The clutch means 13 here further includes actuator means 31 for permitting the transmission shaft 12 to be selectively drivingly connected to the flywheel 11. The actuator means includes a plurality of levers 32 which are pivotally supported on a frame element 33 by means of pivot pins 34. One arm 36 of each lever 32 is provided with a pivot pin 37 adjacent its free end for pivotal connection to an intermediate link 38, the other end of the link 38 being pivotally connected by a pivot pin 39 to the annular actuator disk 41.

The lever 32 is provided with a further arm 42 having an adjustable screw member 43 adjacent the free end thereof, which screw member 43 is adapted to contact the flange 44 of the shift collar 46, which shift collar 46 encircles the transmission input shaft 12 and is slideably supported on a sleeve guide 48. The shift collar 46 is engaged by and moved axially relative to the transmission input shaft 12 by any conventional means, such as a pivoted shift fork 47, which shift fork may in turn be actuated in a conventional manner from a manually actuated vehicle clutch pedal by means of a conventional interconnecting mechanical linkage.

The clutch means 13 is in this embodiment further provided with a plurality of compression springs 51 for normally urging and maintaining the clutch means in the engaged position. The compression springs 51 at one end bear against suitable bearing pads 52 fixedly secured to the annular actuator disk 41. The other end of the compression springs 51 bear against an annular retainer plate 53, which retainer plate 53 has a plurality of stop members 54 fixedly secured thereto. The stop members 54 are normally resiliently urged by the springs 51 into bearing engagement with the inner surface 56 of the frame element 33.

Considering now the transmission input shaft 12, same extends rearwardly of the flywheel 11 and has its rearward end extending through the forward wall of the bearing cover 61, which cover comprises a portion of the transmission housing. The cover 61 is fixedly secured to the sleeve guide 48 which extends outwardly therefrom in surrounding relation to the input shaft 12. The rearward end of the transmission input shaft 12 has a conventional transmission input gear or drive pinion 62 nonrotatably secured thereto, which input gear 62 is in mesh in a conventional manner with further gears located within the transmission for driving either simple or multiple countershafts as desired although the benefits of this invention are most fully attained in high capacity systems, such as those involving a pair of diametrically opposite countershaft gears substantially in the manner as disclosed in U.S. Pat. No. 3,105,395.

The transmission shaft 12 is further provided with a reduced diameter pilot portion 63 adjacent its forward end, which pilot portion 63 extends into a pilot opening 64 provided centrally of the flywheel 11. A resilient bearing and bushing assembly 66 is positioned within the pilot opening 64 for rotatably supporting the pilot portion 63.

The resilient bearing and bushing assembly 66 in one preferred embodiment specifically includes spaced inner and outer support rings 67 and 68 and an annular ring of resilient, elastomeric material 69 positioned therebetween. The elastomeric ring 69, which is preferably constructed of rubber or other suitable elastomers, is preferably fixably secured to the adjacent peripheral surfaces of the inner and outer rings 67 and 68, respectively, as by being bonded thereto, whereby the rings 67, 68 and 69 form a unitary assembly. The outer support ring 68 is preferably pressed, or otherwise firmly secured, within the flywheel opening 64 for securely positioning the resilient bushing and bearing assembly 66 relative to the flywheel.

A further annular sleeve bushing 71 is preferably disposed within the inner annular support ring 67 and surrounding the reduced pilot portion 63 for facilitating rotation of the pilot portion relative to the resilient bushing assembly, which assembly is mounted for rotation with the flywheel.

OPERATION

The drawing illustrates the clutch and flywheel assembly 10 in the engaged position wherein the clutch 13 in a conventional manner drivingly connects the flywheel 11 to the transmission input shaft 12. In this position, the spring 51 resiliently urge the annular actuator disk 41 axially toward the flywheel friction surface 18 (leftwardly in the drawing) so that the friction disks 19, 21 and 29 are compressed therebetween. The torque imposed on the flywheel 11 and on the driving disk 29 is then frictionally transferred to the driven clutch disks 19 and 21, which disks in turn drive the transmission input shaft 12.

When it is desired to drivingly disconnect the transmission input shaft 12 from the flywheel 11, same is accomplished, also in a conventional manner by pivoting the shift fork 47 (counterclockwise in the drawing), as by manually depressing the vehicle clutch pedal. Pivoting of the shift fork 47, in the specific mechanism here utilized to illustrate the invention, causes the shift collar 46 to move axially (leftwardly in the drawing) relative to the input shaft 12 whereupon the flange 44 contacts the stops 43. Continued leftward movement of the collar 46 by the shift fork 47 then causes a corresponding pivotal movement of the levers 32 such that the arms 36 are moved outwardly away from the flywheel 11, which outward movement of the arms 36 imposes a pulling force on the intermediate links 38. This thus causes the annular actuator disk 41 to be moved axially away from the flywheel (rightwardly in the drawing) so as to release the compression force imposed on the intermediate clutch disks, thereby permitting the flywheel 11 and the driving clutch disk 29 to rotate freely relative to the driven clutch disks 19 and 21.

During vehicle operation, or as a result of original manufacturing errors, relative misalignment often occurs between the flywheel 11 and the transmission input shaft 12, which misalignment may be caused in part by several factors, such as manufacturing or assembly tolerances, or imposition of external loads and distortions on the vehicle causing corresponding relative distortions between the flywheel and the transmission, particularly the input shaft thereof. This misalignment occurs not only in the form of relative angular movement between the flywheel 11 and the input shaft 12, but also in the form of relative radial displacement therebetween. This misalignment is compensated for in the present invention by the resilient bushing 66, which bushing, due to the provision of the intermediate annular elastomeric ring 69, is able to accommodate both angular and radial misalignment between the flywheel 11 and the transmission input shaft 12 without causing undesirable loading conditions on the bearing and consequent failure thereof.

Provision of the resilient bushing 66 thus results in the transmission input shaft being able to move or float relative to the flywheel, both angularly and radially, thereby enabling the transmission and the flywheel to be misaligned to a limited extent, whether due to manufacturing and assembling tolerances or due to the imposition of external loads imposed on the vehicle. This permissible floating between the flywheel and the transmission input shaft thus overcomes a serious bearing failure problem which has existed in the prior known flywheel and clutch assemblies, and thus permits the present flywheel and clutch assembly to be successfully operated for substantially longer periods of time without requiring periodic inspections or maintenance.

While the embodiment of the invention illustrated is effective and preferable, it will be recognized that in some instances either or both of the support rings 67 and 68 may be omitted. In such case the elastomeric ring 69 will be bonded directly to the wall of the opening 64 and the bushing 71 will provide both contact for the shaft pilot and retention for the inner surface of the elastomeric ring. Further, the bushing 71 may be replaced by a ball, roller or other antifriction bearing if desired.

Although a particular perferred embodiment of the invention has been disclosed above for illustrative purposes, it will be understood that still other variations or modifications thereof which lie within the scope of the appended claims are also fully contemplated.

The embodiments of the invention in which an exclusive property or privilege is claimed are defined as follows:

1. In combination, a releasable torque-transmitting coupling adapted to be driven from an engine, a transmission input shaft substantially aligned with said releasable torque-transmitting coupling and having a drive gear thereon in meshing engagement with other transmission gears, and pilot bearing means coacting between said releasable torque-transmitting coupling and a portion of said transmission input shaft for rotatably supporting said input shaft on said mechanical device, the improvement wherein said pilot bearing means includes a recess within said releasable torque-transmitting coupling and said input shaft has a pilot portion thereon disposed within said recess, and said pilot bearing means further includes resilient bushing means positioned within said recess surrounding said pilot portion of said input shaft for permitting radial floating movement of said pilot portion relative to said releasable torque-transmitting coupling.

2. In combination, a flywheel adapted to be driven from an engine, a transmission input shaft substantially aligned with said flywheel and having a drive gear thereon in meshing engagement with other transmission gears, clutch means coacting between said flywheel and said transmission input shaft for permitting said transmission input shaft to be selectively driven from said flywheel, and pilot bearing means coacting between said flywheel and a portion of said transmission input shaft for rotatably supporting said input shaft on said flywheel, the improvement wherein said pilot bearing means includes a central bore formed within said flywheel and said input shaft has a pilot portion thereon disposed within said bore, and said pilot bearing means further includes resilient bushing means positioned within said bore surrounding said pilot portion of said input shaft for permitting radial floating movement of said pilot portion relative to said flywheel.

3. The combination according to claim 2, in which the resilient bushing means includes an annular ring of elastomeric material.

4. The combination according to claim 3, in which the resilient bushing means also permits relative angular movement between the rotational axis of said flywheel and the rotational axis of said transmission input shaft.

5. The combination according to claim 3, in which the resilient bushing means includes spaced inner and outer support rings with said ring of elastomeric material being positioned between and fixedly secured to said inner and outer support rings.

6. The combination according to claim 5, in which the flywheel is provided with a recess extending axially inwardly from one end thereof, said clutch means including a clutch disk slidably splined to the input shaft and disposed for axial movement relative to the flywheel for frictionally engaging same, and actuator means coacting with said clutch disk for causing same to be moved axially into frictional engagement with said flywheel, said actuator means including a shift collar disposed in surrounding relationship to said input shaft and movable axially relative thereto, whereby in case of a misalignment between the flywheel axis and that of the input shaft, the clutch disks can follow the flywheel and not be adversely affected by such misalignment.

7. The combination according to claim 5, in which the outer support ring is fixedly secured relative to said flywheel, and in which a sleeve bushing is disposed between the inner support ring and the pilot portion of said input shaft.

* * * * *